(12) United States Patent
Narayanan et al.

(10) Patent No.: US 7,701,937 B2
(45) Date of Patent: Apr. 20, 2010

(54) METHOD AND APPARATUS FOR IP MULTICASTING

(75) Inventors: Vidya Narayanan, Schaumburg, IL (US); Christophe Janneteau, Bois d'Arcy (FR); George Popovich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 1141 days.

(21) Appl. No.: 11/249,637

(22) Filed: Oct. 13, 2005

(65) Prior Publication Data

US 2007/0086458 A1 Apr. 19, 2007

(51) Int. Cl.
*H04L 12/28* (2006.01)
(52) U.S. Cl. ........................................ 370/390; 370/338
(58) Field of Classification Search .................. None
See application file for complete search history.

(56) References Cited

U.S. PATENT DOCUMENTS

| | | | | |
|---|---|---|---|---|
| 6,298,058 | B1 * | 10/2001 | Maher et al. ................. | 370/390 |
| 6,418,480 | B1 * | 7/2002 | Rijhsinghani ................ | 709/245 |
| 6,658,463 | B1 | 12/2003 | Dillon | |
| 6,765,892 | B1 * | 7/2004 | Leung et al. ................ | 370/332 |
| 6,769,000 | B1 | 7/2004 | Akhtar | |
| 7,236,465 | B2 * | 6/2007 | Banerjee et al. ............. | 370/312 |
| 7,339,903 | B2 * | 3/2008 | O'Neill ....................... | 370/313 |
| 7,496,061 | B2 * | 2/2009 | Oswal et al. ................ | 370/312 |
| 7,623,517 | B2 * | 11/2009 | Suzuki ........................ | 370/390 |
| 2003/0018715 | A1 * | 1/2003 | O'Neill ....................... | 709/204 |
| 2004/0095912 | A1 * | 5/2004 | Gao et al. .................... | 370/338 |
| 2005/0237962 | A1 * | 10/2005 | Upp et al. .................... | 370/313 |
| 2005/0281264 | A1 * | 12/2005 | Hsu et al. .................... | 370/390 |
| 2006/0140177 | A1 * | 6/2006 | Karhu .......................... | 370/356 |
| 2006/0262792 | A1 * | 11/2006 | Rokui .......................... | 370/390 |
| 2006/0271780 | A1 * | 11/2006 | Oswal et al. ................. | 713/163 |
| 2006/0274672 | A1 * | 12/2006 | Venkitaraman et al. ..... | 370/254 |
| 2007/0070946 | A1 * | 3/2007 | Dorenbosch et al. ........ | 370/331 |

FOREIGN PATENT DOCUMENTS

EP 1318647 A2 11/2003

OTHER PUBLICATIONS

Cain, et al., Internet Group Management Protocol, Version 3, Request for Comments:3376, The Internet Society, Oct. 2002; URL http://www.faqs.org/ftp/rfc/pdf/rfc3376.txt.pdf.

* cited by examiner

*Primary Examiner*—Phirin Sam
(74) *Attorney, Agent, or Firm*—Valerie M. Davis

(57) ABSTRACT

A method and apparatus for multicast communication, wherein the apparatus is configured for performing the method that includes the steps of: communicating (210) a request to a server to join a first multicast group, the first multicast group associated with a first multicast address; determining (220) a second multicast group corresponding to the first multicast group, the second multicast group having a second multicast address; joining (230) the second multicast group to create a corresponding multicast tunnel; receiving (240) a first multicast packet from the server using the multicast tunnel, the first multicast packet comprising the first and second multicast addresses; removing (250) the second multicast address from the first multicast packet; and forwarding (260) the first multicast packet comprising the first multicast address to an entity.

16 Claims, 7 Drawing Sheets

METHOD AND APPARATUS FOR IP MULTICASTING

FIELD OF THE INVENTION

The present invention relates generally to multicast communication and more specifically to multicast in multicast tunneling in a Mobile Internet Protocol (IP) enabled network.

BACKGROUND OF THE INVENTION

Mobile IP technology is a solution for seamless mobility on a network such as, for instance, the global Internet or a private network that is scalable, robust and secure, and that allows roaming or mobile entities (also commonly referred to in the art as mobile nodes) such as radios, phones, laptops, Personal Digital Assistants (PDAs), etc., to maintain ongoing communications while changing their point of attachment to the network. Mobile IP protocols are described in the Internet Engineering Task Force (IETF) Request for Comments (RFC) 3344 titled "IP Mobility Support for IPv4" (also commonly referred to in the art as MIPv4 and wherein IPv4 is described in RFC 791) and in RFC 3775 titled "Mobility Support in IPv6" (also commonly referred to in the art as MIPv6 and wherein IPv6 is described in RFC 2460). Both MIPv4 and MIPv6 are referred to herein as standard Mobile IP.

More specifically, in accordance with standard Mobile IP, each mobile entity is always identified by a home address (HoA) (regardless of its current point of attachment to the network), which provides information about its point of attachment to a home network. However, when the mobile entity is connected to the network outside of its home network, i.e. when visiting a foreign network or a foreign domain, the mobile entity is also associated with a care-of address (CoA) that provides information about its current point of attachment. Moreover, in Mobile IP enabled networks (i.e., networks in which multiple (two or more) entities implement standard Mobile IP), a client-server approach may be used, for example, to facilitate secure communications. For such an approach, a server in a mobile entity's home network may have the functionality, among other functionality, for authenticating the mobile entity prior to the mobile entity being allowed to communicate with other entities within a network. A client-server model may also be used for other purposes as is well known in the art, such as virtual private network (VPN) functions.

IP Multicasting is a bandwidth-conserving technology that reduces traffic by simultaneously delivering a single stream of information comprising one or more packets to a plurality of recipients, wherein a packet is defined generally herein as a message transmitted over a network from one entity to another entity and may include, but is not limited to, an IP datagram. IP Multicasting is described in RFC 1112 titled "Host Extensions for IP Multicasting" and is also referred to herein as standard IP Multicasting. In accordance with standard IP Multicasting, an entity may join an IP multicast group (also referred to herein as a "native" multicast group) that is associated with or identified by an assigned IP multicast address. Thereafter, standard IP Multicasting is used to facilitate delivering source traffic (i.e., packets) to multiple receivers (i.e., group members) that have joined the multicast group, thereby, minimizing bandwidth since these packets do not need to be individually unicast to each of the members of the multicast group. This bandwidth savings makes the use of IP Multicasting technology desirable within any network including a Mobile IP enabled network.

Multicast communication, however, is not optimally supported for mobile entities that implement Mobile IP. This is because typically either the multicast nature of a communication is lost (due to unicast encapsulation and delivery of multicast packets), or the client-server model of communication is not preserved (due to receipt by a mobile entity of multicast packets directly without first going through a server such as one described above).

More particularly, standard Mobile IP supports two methods of receiving multicast packets. In the first method, multicast packets are sent to a home agent that joins a multicast group on behalf of a mobile entity, and the home agent then tunnels these packets in unicast to the mobile entity. A home agent is a mobility server in the mobile entity's home network with which the mobile entity registers a care-of-address when the mobile entity is in a foreign network. The home agent registration enables the home agent to send packets destined for the mobile entity through a tunnel to the care-of-address, wherein upon arriving at the end of the tunnel the packets are delivered to the mobile entity. A tunnel is the path followed by a packet while it is encapsulated. The model is that while encapsulated, a packet is routed to a knowledgeable decapsulating agent, which decapsulates the packet and then correctly delivers it to its ultimate destination. In the second method for receiving multicast packets in a Mobile IP enabled network, mobile entities join multicast groups directly and packets reach them natively using standard IP Multicasting.

Accordingly, for the first method the multicast nature of the traffic is lost, which degrades the potential bandwidth savings from using multicast communications. For the second method the client-server model is lost, which may adversely impact secure communications in the network. This loss of secure communications may be undesirable in networks where secure communications are critical, such as in Public Safety applications.

Thus, there exists a need for a method and apparatus for multicast communications within Mobile IP enabled networks that both preserves the client-server model and realizes more of the potential bandwidth savings of using IP Multicasting.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
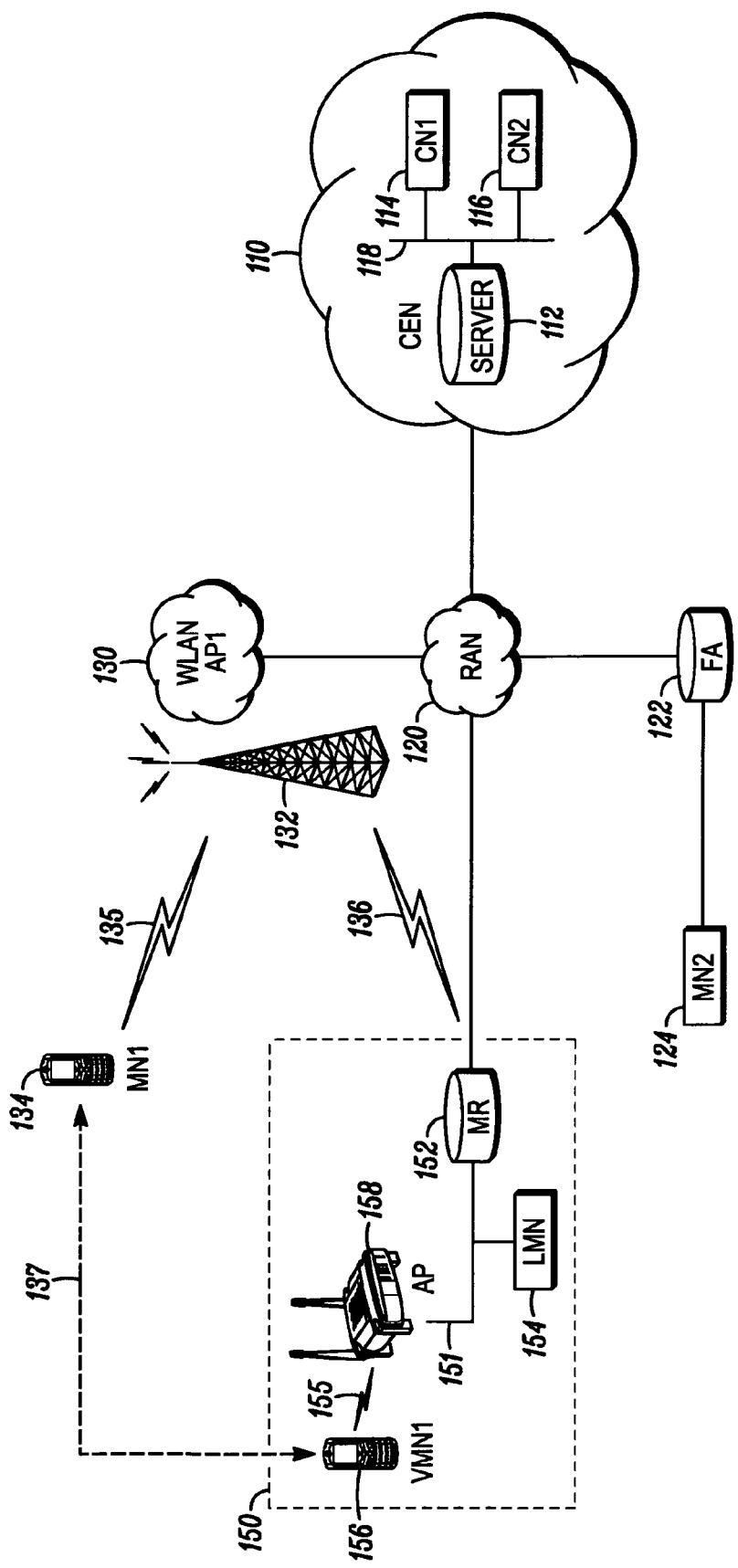
FIG. 1 illustrates a diagram of a communication network implementing embodiments of the present invention.

Before describing in detail embodiments that are in accordance with the present invention, it should be observed that the embodiments reside primarily in combinations of method steps and apparatus components related to a method and apparatus for multicast communication in a Mobile IP network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for multicast communications in a Mobile IP network described herein. The non-processor circuits may include, but are not limited to, a radio receiver, a radio transmitter, signal drivers, clock circuits, power source circuits, and user input devices. As such, these functions may be interpreted as steps of a method to perform the multicast communication in a Mobile IP network described herein. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments multicast communication methods and apparatus in a Mobile IP network are described. The teachings herein describe multicast-in-multicast tunneling of native multicast packets to preserve the advantages of multicast transmission. A set of multicast groups referred to herein as Mobile Multicast Groups (or MMGs) are assigned IP multicast addresses that are reserved for implementing the various embodiments. Each native multicast group gets mapped to a MMG from the set of MMG. In an embodiment, a correspondent node (CN) in a network sources a data stream (e.g., packets) to a native multicast group. A first entity in the network has a user that desires to join the native multicast group to receive the packets destined to that group. A second entity that serves the first entity joins the corresponding MMG on behalf of the first entity, and a server in the infrastructure joins (and becomes a member of) the native multicast group on behalf of the second entity. The packets sourced by the CN are received by the server (since it is a member of the native multicast group). The server then encapsulates the packets with the corresponding MMG headers, which are tunneled to the second entity. The second entity receives the tunneled multicast-in-multicast packets and removes (decapsulates) the MMG headers and forwards the native multicast packets to the first entity.

The embodiments described herein preserve bandwidth savings that may be realized by using IP multicasting technology within the Mobile IP network. The embodiments described herein further preserve the client-server model thereby eliminating a tradeoff between the secure communications enabled by utilizing the client-server model and the bandwidth savings obtained by using the IP Multicasting technology. Those skilled in the art will realize that the above recognized advantages and other advantages described herein are merely exemplary and are not meant to be a complete rendering of all of the advantages of the various embodiments of the present invention.

Referring now to the drawings, and in particular FIG. 1, a communication network is shown and indicated generally at 100. Network 100 is one example of a network that may implement various embodiments of the present invention. Network 100 comprises, for example: a customer enterprise network (CEN) 110 that may be a private network owned by a Public Safety agency, for instance, and having a plurality of fixed entities and mobile entities having CEN 110 as their home network; a radio access network (RAN) 120 coupled to the CEN 110 that may be a public or a private network; and a wireless local area network (WLAN) 130 coupled to the RAN 120 that may be a public or a private network. The various networks may, for example, be coupled together via suitable wires and cables using wired techniques well known in the art.

In general CEN 110, RAN 120 and WLAN 130 may comprise various infrastructure elements as is well known in the art. These infrastructure elements may include, but are not limited to as access points, base stations, various servers (e.g., Authentication Authorization and Accounting (AAA) servers, Virtual Private Network (VPN) servers, etc.) and the like, wherein a server 112 comprising the infrastructure of CEN 110 and an access point (AP1) 132 (which in this embodiment is a base station) comprising the infrastructure of WLAN 130 are shown for illustrative purposes. An access point is a layer 2 (in the well known Open System Interconnect networking model) device that provides a wireless link connection to a mobile node in a WLAN. Server 112 includes functionality (including all necessary software and hardware, such as processors, memory, a transceiver, etc.) for implementing the various embodiments described herein. Server 112, in accordance with various implementations, may further comprises one or more of a HA, an AAA server and a VPN server or gateway co-located as separate logical entities on the same physical device. In the illustrations below, server 112 comprises at least a HA and a VPN gateway.

Those skilled in the art will recognize and appreciate that the specifics of this illustrative example are not specifics of the invention itself and that the teachings set forth herein are applicable in a variety of alternative network topologies. For example, since the teachings described do not depend on the type of network topology (including the number and type of infrastructure elements contained therein), they can be applied to any type of network topology. As such, other alternative implementations of using different types of network topologies including ones associated with other types of networks such as Wide Area Networks (WANs), the Internet, etc. are contemplated and are within the scope of the various teachings described herein.

Various entities, including mobile entities, may use network 100 for communicating information, for instance, in the form of packets. It should be understood by those skilled in the art that the various entities (including routers and hosts) that communicate over network 100 comprise any suitable transceiver for transmitting and receiving packets and suitable memory and one or more processors for storing and executing software for performing methods described below in accordance with embodiments herein.

For example, the entities shown in FIG. 1 for illustrative purposes are a first correspondent node (CN1) 114 and a second correspondent node (CN2) 116 that have their point of attachment in the CEN 110. A correspondent node is a peer with which a mobile node is communicating, which may be another mobile node or a fixed node (CN1 and CN2 are illustrated as fixed nodes), wherein a fixed node is either a host or a router that is unable to change its point of attachment to network 100 or change its IP address without breaking open sessions. A mobile entity or mobile node is defined herein as an IP device that is capable of changing its point of attachment to network 100 by being configured for using standard Mobile IP. A mobile entity may either be a mobile host (no forwarding functionality) or a mobile router (having forwarding functionality). A mobile host is an end host that is capable of sending and receiving packets, that is, being a source or destination of traffic, but not a forwarder of traffic. A mobile router, on the other hand, is capable of forwarding packets between two or more interfaces.

Returning to the description of CN1 and CN2, both of these entities are shown coupled to server 112 on a common network segment (or IP subnet) 118. Although CN1 and CN2 are illustrated as being directly coupled to server 112, for example using wired techniques as is well known in the art, those of ordinary skill in the art will realize that CN1 and CN2 may alternatively be wirelessly coupled to server 112 and/or coupled via one or more other devices such as routers.

Additional entities illustrated in FIG. 1 are a foreign agent 122 and a mobile node (MN2) 124, which both have their point of attachment in the RAN 120. A foreign agent is a router on a mobile node's (e.g., MN2) visited network (i.e., a foreign network that is not the mobile node's home network) that provides routing services to the mobile node upon the mobile node registering with the foreign agent. The foreign agent decapsulates and delivers packets to the mobile node that were tunneled by the mobile node's home agent. For packets sent by the mobile node (e.g., MN2), the foreign agent may serve as a default router for registered mobile nodes. In this embodiment, it is assumed that MN2 registers with FA 122 using standard Mobile IP protocol (e.g., in accordance with MIPv4 or MIPv6), whereby FA 122 then serves as a decapsulating agent for MN2.

Furthermore a mobile node (MN1) 134 (illustrated as a PDA but may be another type of device such as one listed above) has its point of attachment in the WLAN 130. In this embodiment, AP1 provides a wireless link connection 135 for MN1 to the WLAN 130. Another entity illustrated in FIG. 1 is a mobile router (MR) 152 that has its point of attachment to the RAN 120, and may also be wirelessly connected 136 to the WLAN 130, for instance through AP1. Let us assume, for purposes of this illustration, that RAN 120 is a foreign network to MR 152, and a co-located care-of address (CCoA) has been assigned to MR 152 in accordance with standard Mobile IP.

In this embodiment MR 152 acts as a gateway between an entire mobile network 150 (that comprises one or more IP subnets) and the rest of network 100. MR 152 further serves as a decapsulation agent (for Mobile IP and/or multicast purposes in accordance with teachings herein) for nodes that have a point of attachment in mobile network 150. It can be said that such nodes that have a point of attachment to mobile network 150 are "behind" MR 152. In this illustration, a visiting mobile node (VMN1) 156 (whose home network is not the mobile network 150) and a local mobile node (LMN) 154 (whose home network is the mobile network 150) are behind MR 152. This embodiment further illustrates LMN 154 having a wireline connection to MR 152 on a network segment 151, and VMN1 having a wireless connection 155 to mobile network 150 via an AP 158 also connected to network segment 151.

Figure 2:
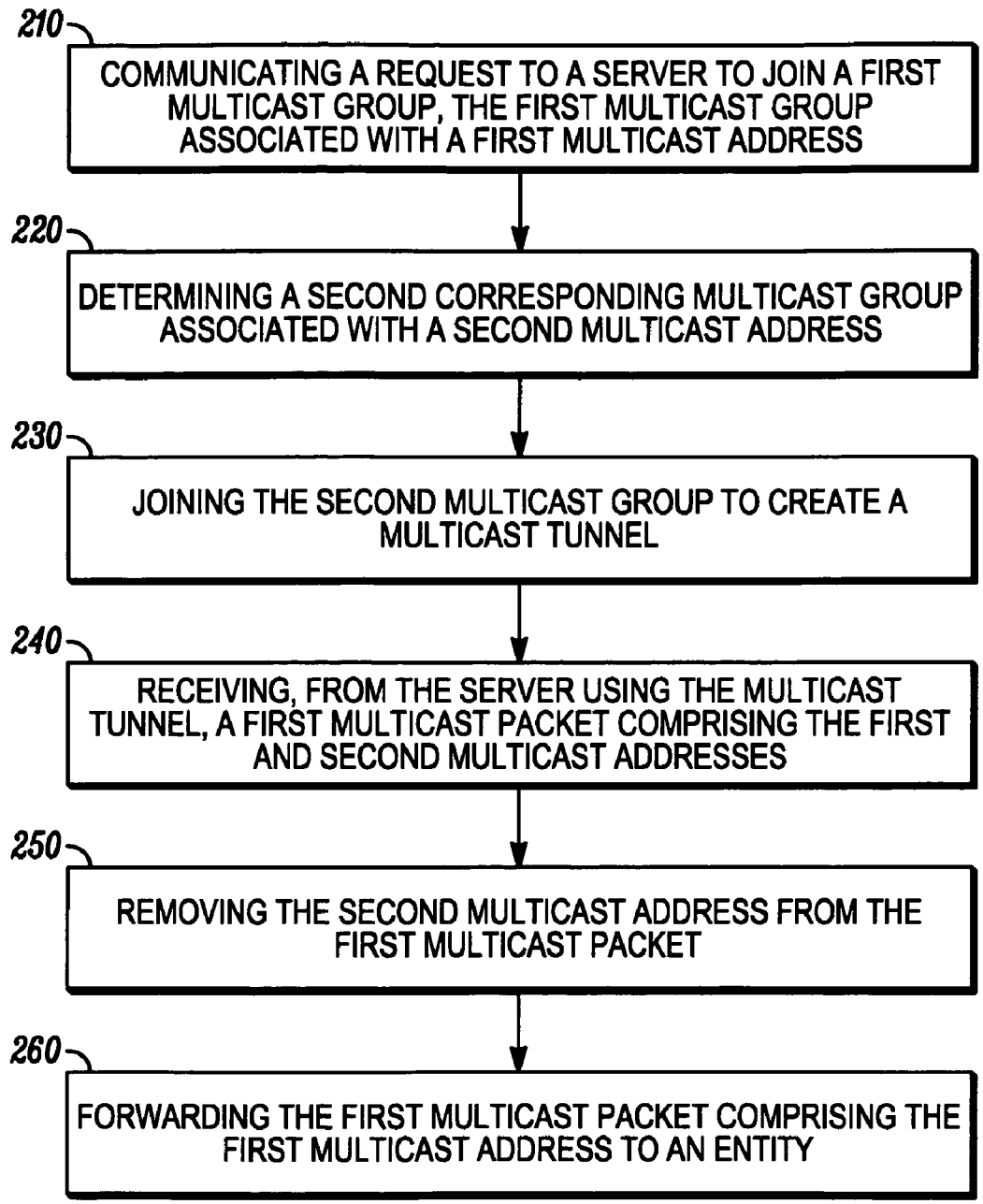
FIG. 2 illustrates a flow diagram of a method in accordance with an embodiment of the present invention.
Figure 3:
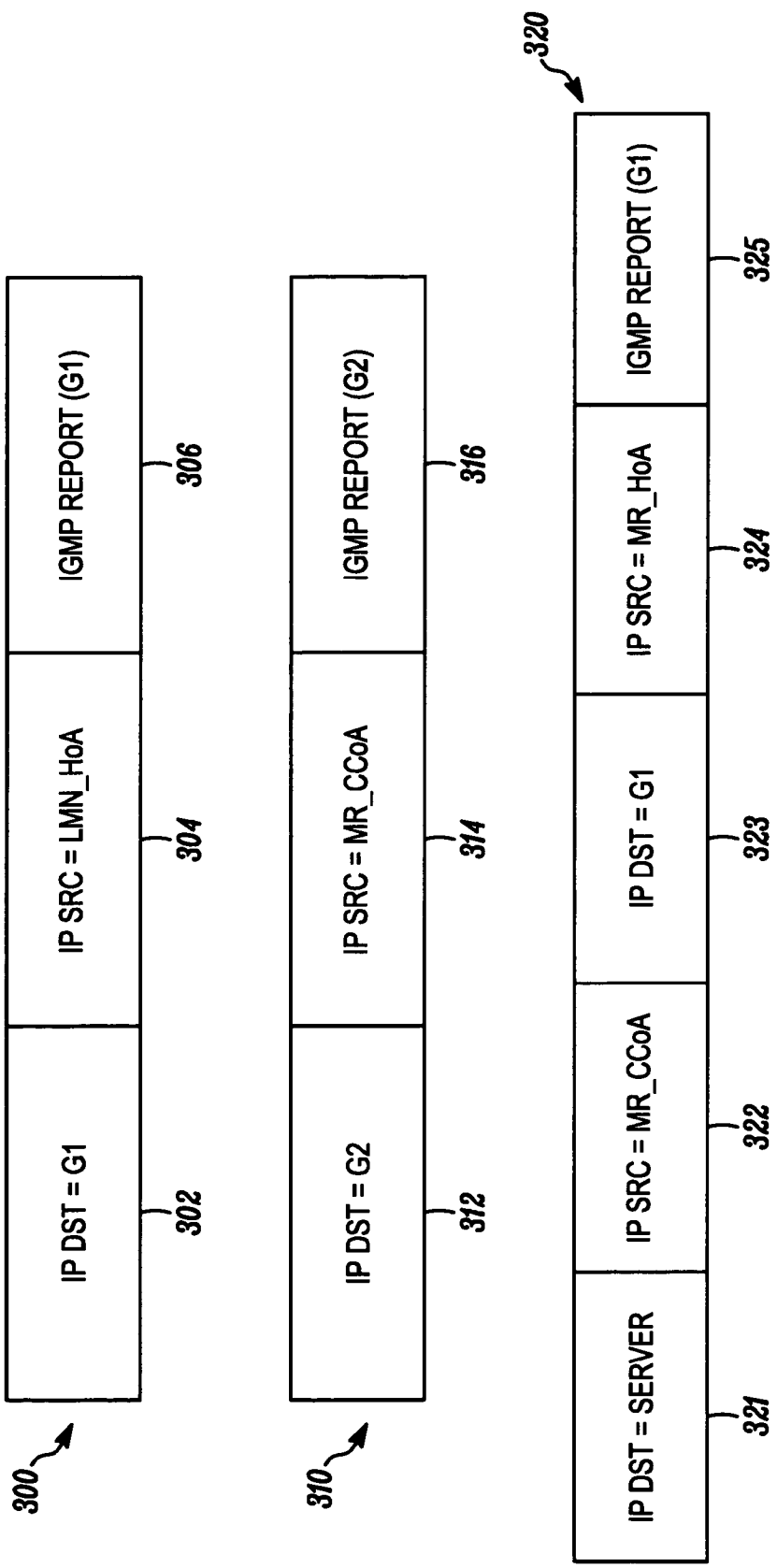
FIG. 3 illustrates messages for enabling multicast communication in accordance with an embodiment of the present invention.

Turning now to FIG. 2, a flow diagram illustrating a method in accordance with an embodiment herein is shown and generally indicated at 200. Method 200 may be performed, for instance, in a mobility agent (such as FA 122) or a mobile router (such as MR 152) in network 100. It should be understood by those skilled in the art that methods in accordance with embodiments described herein (e.g., method 200 and methods 600 and 700 described below in accordance with FIGS. 6 and 7) may be further implemented as a processor readable storage medium containing processor readable code for programming a processor to perform the method(s). Examples of such processor readable storage medium include, but are not limited to, read-only memory, random-access memory, CD-ROMs, magnetic tape, optical data storage devices, and the like. Method 200 comprises the steps: of communicating (210) a request to a server to join a first multicast group, the first multicast group associated with a first multicast address; determining (220) a second multicast group corresponding to the first multicast group, the second multicast group having a second multicast address; joining (230) the second multicast group to create a corresponding multicast tunnel; receiving (240) a first multicast packet from the server using the multicast tunnel, the first multicast packet comprising the first and second multicast addresses; removing (250) the second multicast address from the first multicast packet; and forwarding (260) the first multicast packet comprising the first multicast address to an entity.

Various embodiments using method 200 will now be explained below by reference to FIGS. 3 through 7. These described embodiments implement MIPv4 and related protocols (e.g., Multicast Listener Discovery in accordance with RFC 2710). However, those of ordinary skill in the art will realize that the various teachings are equally applicable wherein MIPv6 and related protocols are implemented, and such alternative embodiments are contemplated and are within the scope of the various teachings herein.

In a first embodiment, LMN 154 desires to join a native multicast group G1 to receive traffic sourced to and destined for multicast group G1 (e.g., G1 multicast traffic). It is assumed for purposes of the following discussion that LMN 154 does not contain functionality to directly perform multicast communications using a server in accordance with the teachings herein and thus uses MR 152 for performing proxy multicast communications using a server as described in detail below. In addition, one skilled in the art will realize that the following teachings with respect to the embodiment wherein LMN 154 desires to receive G1 multicast traffic is equally applicable if entity 154 were a local fixed node (LFN) behind MR 152.

Returning to the description of this first embodiment involving LMN 154, LMN 154 would send out a message indicating its desire to join group G1. This can be done using a protocol described in RFC 2236 titled "Internet Group Management Protocol, version 2" (also referred to in the art and herein as IGMPv2) where IPv4 is implemented. However, although the following embodiments will be described in the context of IPv4 and IGMP protocols, those of ordinary skill in the art will realize that the teachings herein are equally applicable when IPv6 and MLD protocols are used. In accordance with IGMPv2, LMN154 transmits a packet (an IP datagram) 300 comprising a Membership Report 306 for group G1. The packet 300 includes an IP header 304 comprising the LMN HoA as a source address and an IP header 302 comprising the IP multicast address corresponding to native multicast group G1 as a destination address.

Since MR 152 serves LMN 154 as a router, as described above, MR 152 will receive packet 300 and can perform method 200 for facilitating multicast communications in accordance with embodiments of the present invention. However, before describing this functionality in detail, another aspect of the present invention will be described—that is, the use of Mobile Multicast Groups (or MMGs) in accordance with embodiments herein. Each native multicast group of interest (e.g., for desired membership by an entity in network 100) is mapped to a corresponding MMG for facilitating the embodiments described herein. In one embodiment, each MMG is assigned an IP multicast address, for example using methods well known in the art for assigning multicast addresses, and is typically one of a plurality of MMG in a set, wherein the set of MMG is reserved for a given group of mobile entities. The method of mapping a native multicast group (say G1) to an MMG (say G2) can be done in several ways known in the art. For example, such mapping can be performed using Session Initiation Protocol (SIP) announcements in accordance with RFC 3261, using a proprietary message sent to a relevant mobile entity, static pre-established mapping, etc.

We now return to the functionality of MR 152 for implementing embodiments of the present invention. Upon receipt of packet 300 by MR 152 on one of its ingress interfaces, MR 152 creates an IGMP state for group G1 on the ingress interface on which the IGMP join message (e.g., packet 300) was received by adding group G1 to a list of multicast group memberships for network 150, in accordance with IGMPv2. Creating state, thus, associates group G1 with one or more ingress interfaces on which an IGMP join message is received. MR 152 may also optionally create a membership association between LMN 154 and native multicast group G1. The membership association may comprise, for example, a binding between LMN 154 and group G1 in a relevant table entry. Such membership associations aid MR 152 in keeping track of membership in multicast group G1 to, thereby, facilitate forwarding the group G1 multicast packets to the group G1 members that are behind MR 152.

MR 152 performs step 220 and 230, wherein MR 152 determines the corresponding MMG (e.g., MMG G2) that is mapped to group G1 and then joins the corresponding MMG on behalf of LMN 154 through one of the MR's egress interfaces towards RAN 120 by transmitting an IGMP join message 310. Any of the above-mentioned mapping methods, for example, may be used to enable MR 152 to determine or know the MMG to which native multicast group G1 is mapped. Joining the MMG establishes a tunnel from the server 112 (as will be seen) to MR 152 for facilitating multicast communications in accordance with the teachings herein. Returning to packet 310, it comprises an IGMP Membership Report 316 for G2. This packet further includes an IP header 314 comprising the MR 152 CCoA as a source address and an IP header 312 comprising the MMG G2 IP multicast address as a destination address.

MR 152 also (210) tunnels an IGMP join message for native multicast group G1 to server 112, wherein the join message comprises an IGMP Membership Report 325 for native multicast group G1 that is included in a packet 320. In this embodiment, MR 152 communicates the join request to server 112 because it comprises the home agent for MR 152. Packet 320 further comprises an IP header 324 comprising the MR 152 HoA as a source address and an IP header 323 comprising the IP multicast address corresponding to group G1 as a destination address (both 323 and 324 correspond to Membership Report 325). Moreover, packet 320 comprises an IP header 322 comprising the MR 152 CCoA as a source address and an IP header 321 comprising an IP address corresponding to server 112 as a destination address to facilitate tunneling the IGMP join message for native multicast group G1 to server 112.

To conserve bandwidth, MR 152 can join both G1 and G2 only once (by transmitting packets 310 and 320 only once), on behalf of all the nodes behind it. Consequently, if MR 152 is already a member of MMG G2 and has already tunneled packet 320 to the server 112 corresponding to native multicast group G1, it does not necessarily have to perform this functionality again if it receives an IGMP join message for multicast group G1 from a different node behind it, for example from a local fixed node (not shown) or from VMN1. Thus, MR 152 ideally joins G1 and G2 upon receiving a first IGMP join request from any node behind it. In that case, MR 152 can simply create state for group G1 on the interface on which the join message was received (if state has not already been created on that particular interface) and optionally create a membership association between the subsequent node and group G1. Then any subsequent G1 multicast packets that MR 152 receives will be decapsulated and forwarded on all MR 152 ingress interfaces that have state created for group G1 and (in the embodiment where membership associations are created for nodes) to all of the nodes behind MR 152 that have a membership association with group G1. Moreover, it should be observed that in the particular example explained above, MR 152 joined groups G1 and G2 in response to an IGMP join message from a node behind it. However, in other embodiments it may be conceivable that MR 152 may join groups G1 and G2 without having received a join message but because, for instance, it is statically configured to join certain multicast groups (e.g., G1 and G2) for local nodes behind it.

Thus, in accordance with the teachings herein, MR 152 serves as an IGMP proxy for LMN 154 or in other words performs proxy multicast communications on behalf of LMN 154 using server 112. In accordance with IGMPv2, MR 152 functions as a router on its ingress interface(s) towards network 150 and as a host on both its egress interface(s) towards the visited network 120 and on its tunnel-to-server interface (s) towards server 112. Moreover, MR 152 generally collects group membership information on its ingress interface(s), aggregates this information, and in case of changes in the aggregated information (e.g. a new group to subscribe to) proxies this group membership information upstream (i.e. through its egress interface(s) and/or its tunnel-to-server interface.

More particularly, in the embodiment detailed above wherein MR 152 is associated with a CCoA on a visited network (e.g., MR is not served by a FA on the visited network), MR 152 acts as a dual IGMP proxy. MR acts as regular IGMP proxy between its ingress interfaces and its tunnel-to-server interface, proxying subscription for native multicast group G1 by joining the same group G1 through the tunnel to server 112. MR acts as an extended IGMP proxy between its ingress interface(s) and its egress interface(s), proxying subscription for group G1 by joining the mapped MMG G2 through its egress interface(s).

In another embodiment, MR 152 may register with and be served by a FA on the visited network 120. In this case, MR 152 could be assigned the FA IP address as its CoA. Accordingly, if MR 152 can use the 0.0.0.0 address instead of a CCoA as the source IP address to subscribe to G2 through the visited system, then MR 152 can act as a dual IGMP proxy as described above. However, if MR 152 cannot use the 0.0.0.0 address (e.g., where IGMPv1 or IGMPv2 is used and an IGMP router ignores messages with the 0.0.0.0 address, for instance, for security reasons), or if the FA is configured to implement embodiments of the present invention (e.g., method 200) as described in detail below, then MR 152 could simply act as a regular IGMP proxy between its ingress interface(s) and its egress interface(s), proxying subscription for native multicast group G1 by joining the same group G1 through its egress interface. In this second scenario MR 152 generates a packet similar to packet 300 that includes an IGMP Membership Report for group G1 306, an IP header 304 comprising the MR 152 HoA as the source IP address, and an IP header 302 comprising the multicast IP address corresponding to group G1 as the destination address. A further method for use in a MR (e.g., MR 152) is described in detail below by reference to FIGS. 6 and 7 that enables the MR to determine whether it should act as a dual IGMP proxy or simply a regular IGMP proxy for various implementations.

Upon receipt of packet 320, server 112 decapsulates the packet (i.e., removes headers 321 and 322) to find the IGMP Membership Report for multicast group G1 sourced by MR 152. Server 112 then creates state for G1 (ideally if this is the first Membership Report received for group G1) and creates a membership association (e.g., a binding entry in an appropriate table) between MR 152 and group G1 so that it can tunnel group G1 multicast packets to MR 152. It should be understood in the art that if state has already been created for group G1 (e.g., in response to a previous Membership Report or as a default), the server 112 can simply create the membership association between group G1 and MR 152 to track membership in group G1 for forwarding the G1 multicast packets. Server 112 also joins group G1 on behalf of MR 152, and consequently on behalf of LMN 154, by transmitting a packet similar to packet 300 on one of its egress interfaces, the difference in the packet being that the header 304 is substituted with the IP address of server 112 as the source address. In this way, the client server model is preserved for functionality such as, for instance, authentication, security, etc. Moreover, it should be understood by those skilled in the art that server 112 only needs to join group G1 once (by transmitting an IGMP Membership Report) on behalf of all the entities for which it is tracking group G1 membership.

Figure 4:
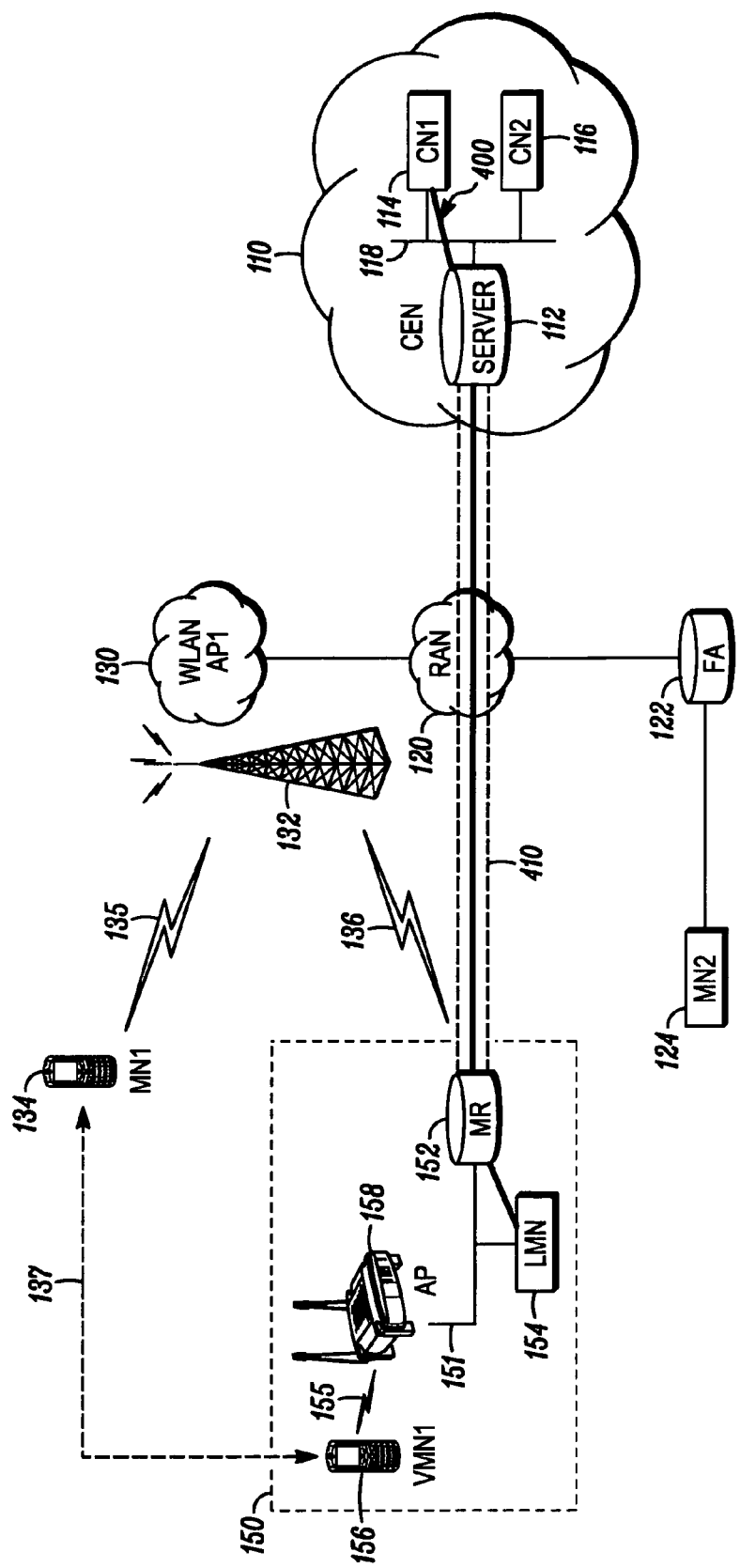
FIG. 4 illustrates multicast in multicast tunneling within the communication network of FIG. 1 in accordance with embodiments of the present invention.
Figure 5:
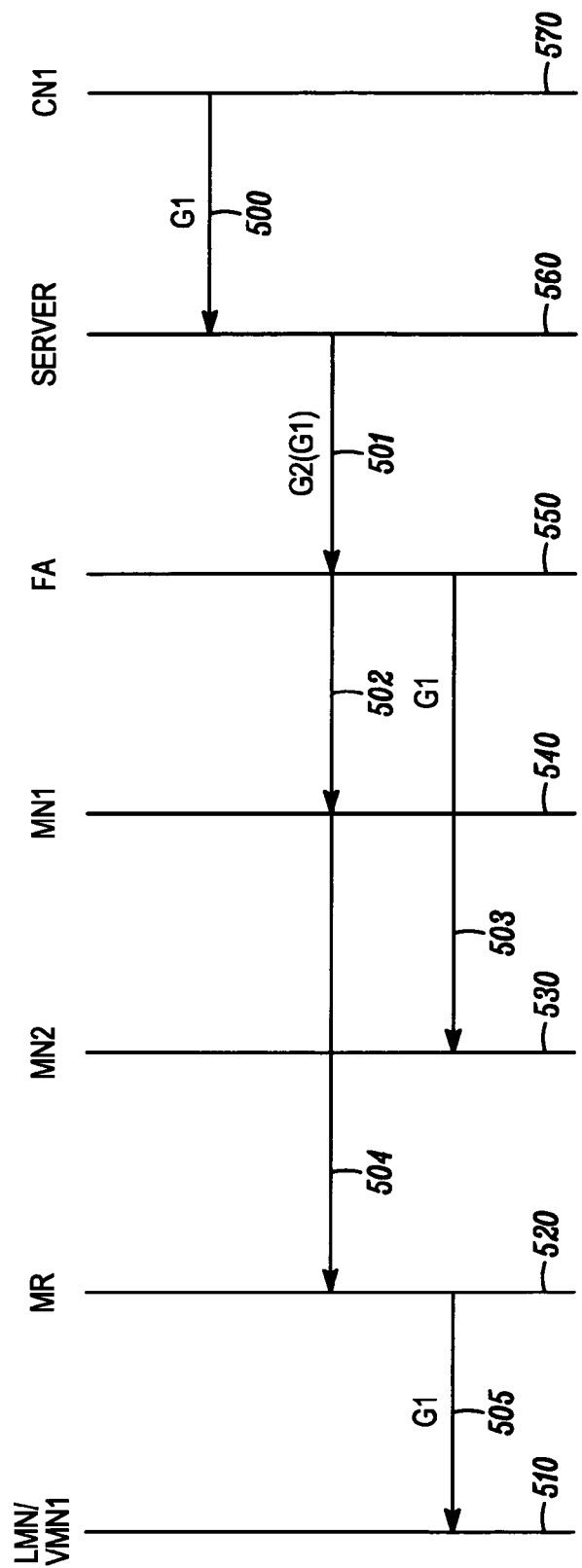
FIG. 5 illustrates a multicast packet message flow based on the multicast in multicast tunneling illustrated in FIG. 4.

By reference to FIGS. 4 and 5, multicast in multicast tunneling within network 100 will be described for various embodiments. It should first be noted that network 100 illustrated in FIG. 4 is identical to network 100 illustrated in FIG. 1 and is accordingly identically labeled. Therefore, the description of the elements in network 100 will not be repeated here for the sake of brevity. However, FIG. 4 further shows a multicast tunnel 410 through which one or more IP multicast packets (as exemplified by a solid line 400) are transmitted from CN1 to LMN 154, in accordance with the teachings herein and as described in more detail below. FIG. 5 illustrates entities in network 100 that may send or receive multicast packets as described herein. More particularly, line 510 corresponds to LMN 154 and VMN1. Line 520 corresponds to MR 152. Line 530 corresponds to MN2. Line 540 corresponds to MN1. Line 550 corresponds to FA 122. Line 560 corresponds to server 112, and line 570 corresponds to CN1.

In this illustration, CN1 sources a stream of data comprising one or more packets (e.g., IP datagrams) to native multicast group G1 using, for instance, standard IP Multicasting in accordance with RFC 1112. These packets are also referred to herein as G1 multicast packets. Since server 112 has joined group G1, it can receive the G1 multicast packets within CEN 110. Upon receiving these multicast packets, server 112 knows (using membership associations that it has created between entities in network 100 and group G1) which entities to which is should forward the G1 multicast packets. Server 112 also knows (using for example methods described above) the mapping between group G1 and its corresponding MMG (s). Server 112 therefore encapsulates each G1 multicast packet with corresponding headers to tunnel the packets to all of the members of the MMG(s) that correspond to native multicast group G1. This multicast in multicast tunneling promotes bandwidth savings by eliminating unicast messaging from the server to the hosts that will ultimately receive the native multicast packets, especially in typical networks where there may be tens and even hundreds of thousands of entities communicating therein.

In this case, upon server 112 receiving the G1 multicast packets it knows that it has a membership association between MR 152 and group G1, and it knows that MMG G2 is mapped to group G1. Accordingly, server 112 encapsulates each G1 multicast packet with appropriate IP headers corresponding to MMG G2, in accordance with standard IP Multicasting, for tunneling these packets through multicast tunnel 410 to MR 152. The packets that are transmitted via multicast in multicast tunneling in accordance with the teachings herein are denoted herein as G2(G1). Each G2(G1) packet comprises the native G1 multicast packet that includes at least an IP header comprising the IP multicast address corresponding to group G1, and each G2(G1) packet further includes at least an IP header comprising the IP multicast address corresponding to G2. As can be seen from FIGS. 4 and 5, each G1 multicast packet (line 400) is tunneled using multicast tunnel 410 from server 112 to MR 152 (see arrowed line 504 in FIG. 5). It can further be seen that since MR 152 was the entity that joined MMG G2, tunnel 410 ends at MR 152.

Upon receipt (step 240 of FIG. 2) of the G2(G1) packets, MR 152 decapsulates (step 250 of FIG. 2) each packet by removing the IP headers corresponding to MMG G2 (one of which comprises the IP multicast address corresponding to MMG G2). MR 152 may then transmit (step 260 of FIG. 2) the native G1 multicast packets to LMN 154 (see arrowed line 505 of FIG. 5) using standard multicast routing. If at some point LMN 154 desires to leave group G1 (so as not to receive further G1 multicast packets), LMN 154 sends a leave request comprising a packet similar to packet 300 except that Membership Report 306 is replaced by a Leave Group message for G1, for instance in accordance with IGMPv2. Upon MR 152 receiving this packet, it tunnels the Leave Group message to server 112 (using a message similar to packet 320) ideally if MR 152 determines that LMN 154 is the last member associated with group G1 and that there are, thus, no more members in network 150 associated with G1 on any interface. In another embodiment, MR 152 may determine that LMN 154 is the last entity for which MR 152 has recorded a membership association. MR 152 upon such a determination may further transmit a Leave Group message for MMG G2. Upon receipt of the Leave Group message from LMN 154 and ideally if it determines that it has no other membership associations corresponding to group G1, server 112 transmits a Leave Group message for group G1. It should be realized by those of ordinary skill in the art that the procedures described above for leaving the native multicast group and the corresponding MMG are applicable to the remaining implementations and embodiments described herein.

Turning now to an implementation wherein MN1 desires to receive traffic sourced to native multicast group G1, wherein it is assumed that MN1 has received a CCoA in network 130. In this implementation, MN1 is configured for direct multicast communications using a server, e.g., server 112, in accordance with the teachings herein. Thus, MN1 would perform the steps 210, 220 and 230 of method 200 instead of a servicing entity such as a router (e.g. a mobile router). MN1 would perform steps 210-230 in the manner described above by reference to MR 152.

Accordingly, MN1 joins group G2 by sending a packet similar to packet 310 except that the IP header 314 comprises the CCoA of MN1. MN1 also joins group G1 through the server 112, by tunneling an IGMP join message for group G1 to server 112 using a packet similar to packet 320 except that header 324 comprises the HoA for MN1, and header 322 comprises the CCoA of MN1. Server 112 functions as described above. Thus, where (as in the above example) CN1 sources a data stream to native multicast group G1, the flow of the IP multicast packets from CN1 to MN1 is illustrated by reference to FIG. 5. Accordingly, server 112 receives the G1 multicast packets from CN1 (500) and encapsulates those packets with the corresponding MMG G2 headers, thereby, generating packets G2(G1) and forwards the G2(G1) packets to MN1 (502). MN1 then decapsulates the G2(G1) packets to obtain the native multicast G1 packets.

Next described is an implementation wherein MN2 desires to receive traffic sourced to native multicast group G1. As stated above, it is assumed that MN2 has registered with FA 122 and is using the FA IP address as its CoA. It is further assumed that FA 122 is configured in accordance with the teachings herein for performing the steps of method 200 and that MN2 is not so configured. Accordingly, MN2 sends an IGMP join message for group G1 that is similar to packet 300 except that header 304 comprises the HoA for MN2. Upon receiving this message, FA 122 ideally verifies that MN2 is a valid mobile node registered at the FA (e.g. using its Mobile IP visitor List). Moreover, it should be noted that header 304 comprises the HoA of MN2 because MN2 has no topologically correct address. Normally regular multicast routers (e.g., IGMP routers) on a visited link would ignore such an IGMP join message for security reasons (e.g., ingress filtering), in accordance with IGMP (including IGMPv2). However, in accordance with the present invention, FA 122 is included with functionality enabling it to receive and act on the join message as described below.

FA 122 then proceeds to perform the steps of method 200. Thus, FA 122: joins MMG G2 (acting as a proxy for MN2) by transmitting a message similar to packet 310 except that header 314 comprises the IP address for FA 122 and creates state for group G1 on the ingress interface on which message 300 was received (if necessary); optionally creates a membership association between MN2 and group G1 for tracking membership to group G1; and also joins group G1 through server 112 by tunneling an IGMP join message for group G1 to the server 112, wherein this join message is similar to packet 320 except that headers 324 and 322 comprise the IP address for FA 122.

Server 112 functions as described above. Thus, where (as in the above example) CN1 sources a data stream to native multicast group G1, the flow of the IP multicast packets from CN1 to MN2 is illustrated by reference to FIG. 5. Accordingly, server 112 receives the G1 multicast packets from CN1 (500) and encapsulates those packets with the corresponding MMG G2 headers, thereby, generating packets G2(G1) and forwards the G2(G1) packets to FA 122 (501) or responding G2 multicast tunnel. FA 122 then decapsulates the G2(G1) packets to obtain the native multicast G1 packets, which it forwards to MN2 (503) using standard multicast routing. In this implementation FA 122 act as a proxy for MN2, subscribing to G2 (locally) and to G1 (via a tunnel to the server) on behalf of MN2.

The embodiments herein can also be implemented where MN2 includes the functionality in accordance with method 200 but FA 122 does not. In accordance with one embodiment, this implementation is enabled using another IGMP protocol described in RFC 3376 titled "Internet Group Management Protocol, Version 3" (also referred to in the art and herein as IGMPv3). Since IGMPv3 allows multicast routers to accept an IGMP Membership Report sent with a 0.0.0.0 source address. Thus, MN2 would function like MN1 in the implementation described above, except that the headers included in the join messages transmitted by MN2 would, of course, be different.

More specifically, MN2 joins group G2 by sending a packet similar to packet 310 except that the IP header 314 comprises the 0.0.0.0 address. MN2 also joins group G1 through the server 112, by tunneling an IGMP join message for group G1 to server 112 using a packet similar to packet 320 except that header 324 comprises the HoA for MN2, and header 322 comprises the IP address of FA 122. Server 112 functions as described above. Thus, where (as in the above example) CN1 sources a data stream to native multicast group G1, server 112 receives the G1 multicast packets from CN1 and encapsulates those packets with the corresponding MMG G2 headers, thereby, generating packets G2(G1) and forwards the G2(G1) packets to MN2. MN2 then decapsulates the G2(G1) packets to obtain the native multicast G1 packets. Note that both multicast tunnels now end at MN2, instead of having one of the tunnels end at the FA. This implementation, thus, makes routing of multicast packets transparent to FA 122. Those of ordinary skill in the art will realize that in a similar embodiment where a mobile router is behind a FA that does not include functionality in accordance with method 200, the mobile router could likewise implement method 200 by using the 0.0.0.0 address similarly to MN2 as described above.

Figure 6:
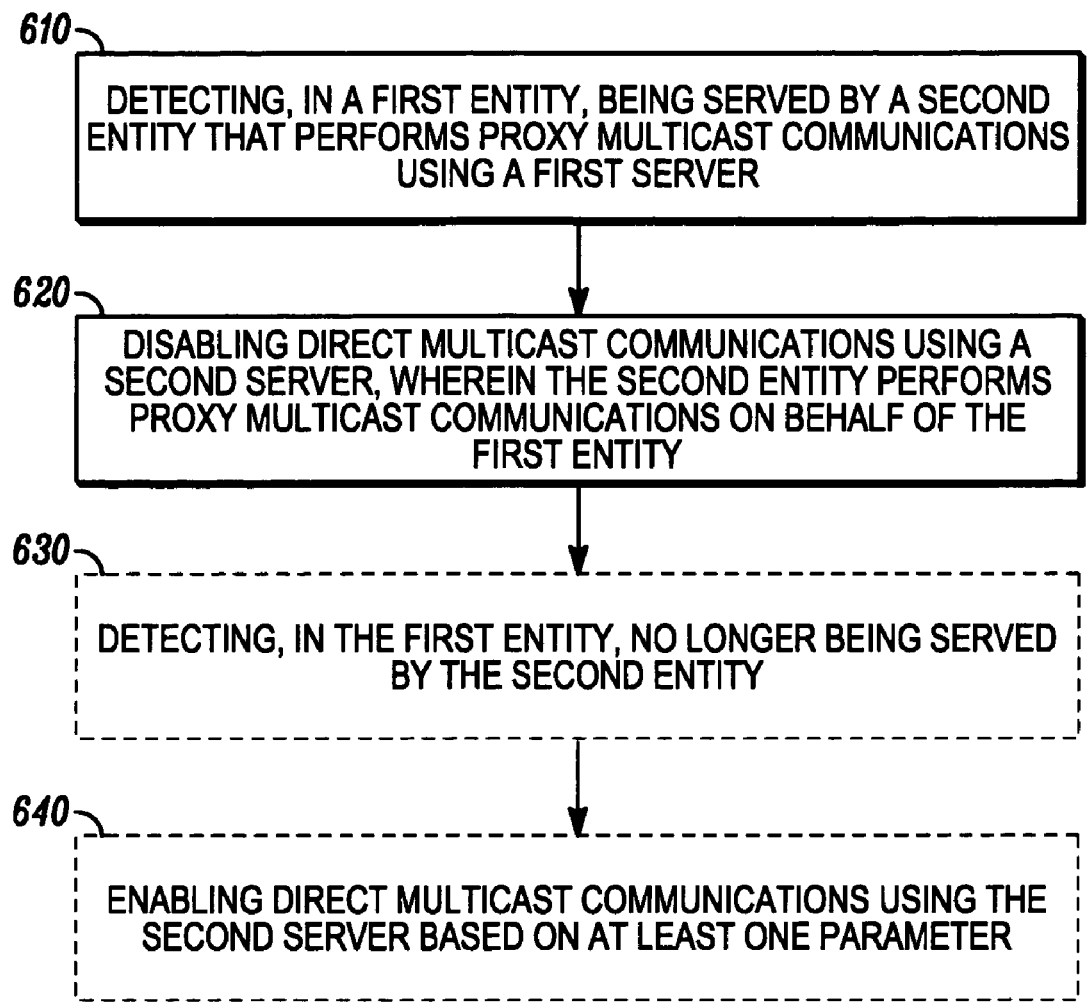
FIG. 6 illustrates a flow diagram of a method in accordance with an embodiment of the present invention.
Figure 7:
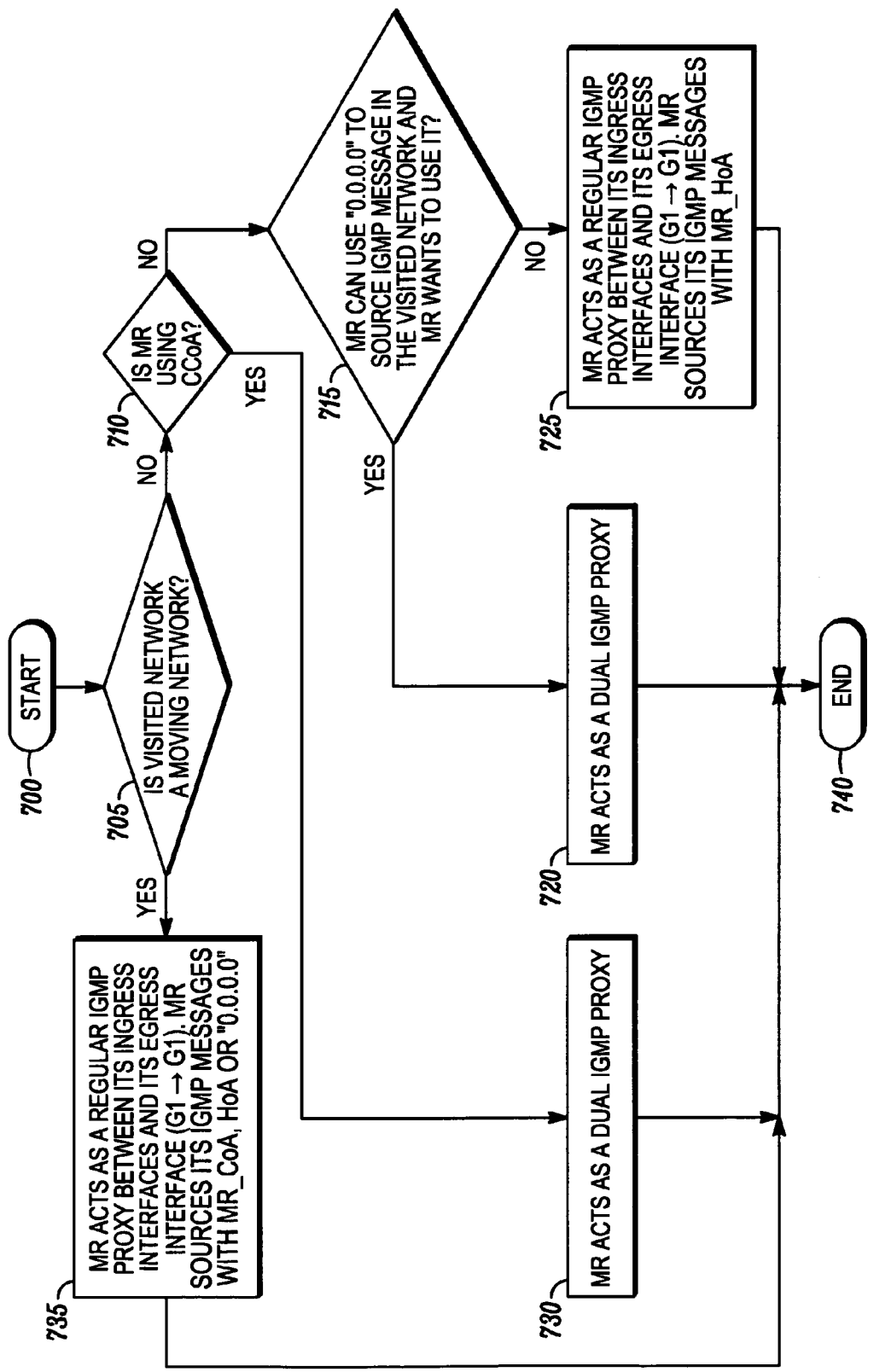
FIG. 7 illustrates a flow diagram of a method in accordance with an embodiment of the present invention.

Additional embodiments of the present invention will be described by reference to FIGS. 6 and 7. In these embodiments, both a first entity desiring to receive multicast traffic from a native multicast group and a second entity that serves the first entity have the functionality (e.g., through performing the steps of method 200) for facilitating multicast communications via a server in accordance with the teachings herein. For example, LMN 154, MN2, MN1, VMN1, FA 122 and MR 152 may all have this functionality. In such a case, the method 600 illustrated in FIG. 6 and the method 700 illustrated in FIG. 7 may be implemented to decrease the number of multicast tunnels (and corresponding IP headers associated with those tunnels) used to implement multicast communications in network 100.

To further describe these embodiments, an implementation using VMN1 will be discussed. Let us assume that MN1 roamed from WLAN 130 to mobile network 150 (as indicated by dashed line 137 in FIG. 1), wherein it is attached behind MR 152. While behind MR 152, VMN1 will be assigned a CCoA in accordance with standard Mobile IP. Further, VMN1 may learn that it is behind MR 152, for instance, through an advertisement from MR 152. Through extensions to this advertisement or via any other suitable messaging (e.g., a proprietary message or message sequence or static configurations in VMN1), VMN1 may further learn or detect (610) that MR 152 is configured with functionality for facilitating proxy multicast communications using a server in accordance with the teachings herein. Upon so learning that it is behind such a MR, VMN1 disables (620) its own direct multicast communications using a server (e.g., its HA which may be server 112) and allows MR 152 to perform proxy multicast communications on its behalf. Thus, VMN1 essentially bypasses its corresponding server for facilitating direct multicast communications (without the use of a proxy as described herein) and resultantly behaves similar to LMN 154 as described above. Moreover, the flow of IP multicast message is as described by reference to FIGS. 4 and 5.

As some subsequent time, VMN1 may detect (630) that it is no longer behind MR 152 and no longer being served by MR 152. Such detection may be performed using any suitable means such as, for instance, detecting that it has attached to another IP subnet, receiving explicit notification from MR 152 that it has stopped multicast proxy service, loss of connectivity to the network, no advertisement from MR 152 of the multicast proxy service functionality for a given length of time, etc. VMN1 may then resume or enable (640) its direct multicast communications using its corresponding server, based on at least one parameter. The at least one parameter may, for instance, include VMN1 detecting or determining, using any suitable method such as one of the methods described above, that it is in a network and is not registered with or served by an entity that may proxy multicast communications, e.g., that it has a direct connection to the infrastructure. This may occur, for example, where VMN1 determines that it has roamed back to a wireless connection in WLAN 130 or that it is directly connected to the infrastructure in RAN 120. Accordingly, VMN1 (now MN1) may enable direct multicast communications using a server (e.g., server 112), in the manner described above. Using this embodiment, multicast communications may be optimized as mentioned above by reducing the headers used. Moreover, when a node is behind an MR, under some circumstances it may be more important to go through the MR's server where the MR link is the most critical one, thereby making the optimizations provided by the MR's server far more critical than the VMN's server. This may be the case, for example, where the MR's server may be performing some special optimizations that may be needed for the multicast traffic as well or where the node behind the MR may be connected via a local WLAN connection that is not as sensitive in loss of bandwidth as the MR's RF link to the infrastructure.

Skilled artisans will realize that this implementation in accordance with method 600 is equally applicable where VMN1 is instead a visiting mobile router to MR 152. Moreover, the VMN or visiting mobile router (node1) in this implementation may disable direct multicast communications (step 620) for other reasons including, but not limited to, when detecting that it has attached to another entity (node2, even if that entity is not performing method 200) that is capable of delivering group G1 multicast packets directly to the VMN or visiting mobile router. Therefore, the VMN or visiting mobile router has no need to directly interact with its own server to receive group G1 packets, since node2 can deliver the G1 packets. This is typically the case when all of the entities (node1, node2) belong to the same agency (administrative domain), or when they belong to two domains that share a trust relationship for delivery of multicast traffic. In this case the group G1 packets could be delivered in the standard unicast Mobile IP tunnel between node2's server (HA) and node2 instead of the multicast tunnel G2.

In yet another implementation similar to the VMN1 implementation, a first mobile router, e.g., MR 152, may attach to a second mobile router. FIG. 7 illustrates a flow diagram of a method that may be implemented in MR 152 to determine the MR functionality as it roams. The method starts at 700 with MR 152 attaching to a new visited network. MR 152 determines (705) whether the visited network is a moving or mobile network. This may be done, for instance, through advertisements. Where MR 152 determines that it has attached to a moving network it may act as a regular IGMP Proxy for the nodes behind it (735) and use, for instance, its CoA as the source address in the IGMP messages for group G1 (e.g., sends a packet 300 corresponding to group G1, wherein header 304 comprises the CoA for MR 152). Header 304 may comprise a Co-located care-of address (CCOA) if MR 152 has one (e.g. uses Dynamic host Configuration protocol (DHCP) in accordance with RFC 2131) or may alternatively comprise its HoA or the 0.0.0.0 one if it does not have such CCoA (and is thereby using a FA for its standard unicast MIP operation).

Where MR 152 determines instead that the visited network is not a mobile network, it then determines (710) whether it is using a CCoA. The CCoA is a topologically correct address dynamically configured by MR 152 (typically with DHCP) and assigned to one of its network interfaces. If no CCoA is available, but a FA is in the network, then MR 152 (using standard Mobile IP) can use the FA IP address to register to its Home Agent. It obtains the FA IP address from FA advertisement messages. The FA IP address is then never configured on any of the interfaces of the MR. If MR 152 is using a CCoA then it can act as a dual IGMP proxy (730) in a similar manner as described above with respect to LMN 154. If MR 152 is not using a CCoA it determines (715) whether it can use the 0.0.0.0 address as described above and that it wants to use this address based upon one or more parameters. The capability of the FA located in the visited domain can be such a parameter. For instance, the MR can decide not to use the 0.0.0.0 to source IGMP for G2, but instead rely on the FA for joining G2 when it detects that the local FA is capable of performing method 200. If yes then MR 152 acts as a dual IGMP proxy (720) using the 0.0.0.0 in the IGMP messaging for group G2. Accordingly, MR 152 transmits packets similar to packets 310 and 320 except that header 322 comprises the FA IP address, and header 314 comprises the address 0.0.0.0. Otherwise, MR 152 acts as a regular IGMP proxy (725) for the nodes behind it and use its HoA as the source address in the IGMP messages for group G1 (e.g., sends a packet 300 corresponding to group G1, wherein header 304 comprises the HoA for MR 152). Method 700 ends at 740.

Benefits of the teachings herein can be realized in other types of network topologies and configurations. For example the teachings herein are useful in a Mobile VPN network, wherein the multicast traffic is directed through a VPN server. Using known techniques, the VPN server would join the multicast group on behalf of the mobile entities and unicast the traffic in the VPN tunnel to each entity that has requested to join the multicast group. However, in accordance with embodiments of the present invention, the multicast nature of the traffic can be preserved outbound from the VPN server using the multicast in multicast tunneling as described above. Moreover, a group key can be used to secure this traffic, in a manner similar to how the VPN server secured the unicast traffic, but without creating the overhead of additional unicast packets.

In other embodiments more than one multicast-in-multicast encapsulation may be performed by a server. This includes, but is not limited to, the following cases: G1-in-EncryptedG1-in-G2, where a server tunnels G1 into a packet address to the same group G1 but this time encrypted, and finally adds an extra encapsulation to G2; and G1-in-G2-in-EncryptedG2, where extra encapsulations may be introduced due to implementation constraints for instance. For example, encryption could be supported both with G1-in-EncryptedG2 and G1-in-G2-inEncryptedG2. G1-in-EncryptedG2 could be realized by realizing first G1-in-G2 encapsulation and then applying IPsec ESP transport mode (for encryption support) on the G2 packet. However if IPsec ESP transport mode is not available, and IPsec ESP tunnel mode needs to be used instead then G1-in-G2-inEncryptedG2 may be accomplished where G1-in-G2 encapsulation is realized first and then IPsec ESP tunnel mode is applied on the G2 packet.

The teachings herein may further encompass scenarios where several multicast-in-multicast encapsulations are performed consequently by several intermediate servers on the path between the first server and the node. For instance, take a case with two servers Serv1 and Serv2. Serv1 receives a packet for group G1 and encapsulates it into a packet addressed to group G2. Serv2 receives a packet for group G2 and encapsulates it into a packet addressed to a group G3. An entity receives packets sent to group G3, and de-tunnels to retrieve original packet sent to G1. In another embodiment, a MR joins group G1 via Serv1 (which performs G1-in-G2 encapsulation). The MR joins G2 via Serv2 (which does G2-in-G3 encapsulation). The MR joins G3 locally, decapsulates, and retrieves G1. Such a mobile router scenario may occur, for example, when Hierarchical Mobile IP (HMIP) is used and the domain where the HA (e.g., Serv1) and a Mobility Anchor Point or MAP (e.g., Serv2) are located use different multicast address space, in other words, the MR when in the MAP's domain cannot directly receive G1-in-G2 from Serv1 because the MAP's domain does not allow routing of G2, but does allow G2-in G3 encapsulation (via MAP=Serv2) and routing of G3 in the MAP's domain.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for multicast communication comprising the steps of:
    communicating a request to a server to join a first multicast group, the first multicast group associated with a first multicast address;
    determining a second multicast group corresponding to the first multicast group, the second multicast group having a second multicast address;
    joining the second multicast group to create a corresponding multicast tunnel;
    receiving a first multicast packet from the server using the multicast tunnel, the first multicast packet comprising the first and second multicast addresses;
    removing the second multicast address from the first multicast packet;
    forwarding the first multicast packet comprising the first multicast address to an entity;
    receiving a leave request from the entity to leave the first multicast group; and
    in response to the leave request,
        communicating a leave request to the server to leave the first multicast group; and
        communicating a leave request to leave the second multicast group.

2. The method of claim 1 further comprising the step of receiving a request from the entity to join the first multicast group, wherein the request to the server is communicated and the second multicast group is joined in response to the receipt of the request from the entity.

3. The method of claim 2, wherein the request from the entity to join the first multicast group is communicated using one of an Internet Group Management Protocol and Multicast Listener Discovery.

4. The method of claim 2, wherein request from the entity to join the first multicast group is a first request from any entity to join the first multicast group.

5. The method of claim 1, wherein the message to the server is communicated and the second multicast group is joined using one of an Internet Group Management Protocol and Multicast Listener Discovery.

6. The method of claim 1, wherein the server comprises at least one of a home agent, a Virtual Private Network (VPN) gateway and an Authentication Authorization and Accounting (AAA) server.

7. The method of claim 1, wherein the leave request from the entity, the leave request to the server and the leave request to leave the second multicast group are communicated using one of an Internet Group Management Protocol and Multicast Listener Discovery.

8. The method of claim 1, wherein the steps of communicating the leave request to the server and communicating the leave request to leave the second multicast group are performed after determining that the entity is a last entity associated with the first multicast group.

9. A processor readable storage medium storing processor readable code for programming a processor, which when the code is executed by the processor causes the processor to perform an operation comprising:

communicating a request to a server to join a first multicast group, the first multicast group associated with a first multicast address;
determining a second multicast group corresponding to the first multicast group, the second multicast group having a second multicast address;
joining the second multicast group to create a corresponding multicast tunnel;
receiving a first multicast packet from the server using the multicast tunnel, the first multicast packet comprising the first and second multicast addresses;
removing the second multicast address from the first multicast packet;
forwarding the first multicast packet comprising the first multicast address to an entity;
receiving a leave request from the entity to leave the first multicast group; and
in response to the leave request,
 communicating a leave request to the server to leave the first multicast group; and
 communicating a leave request to leave the second multicast group.

10. Apparatus for multicast communication, comprising:
a transceiver;
a memory; and
a processor coupled to the memory and the transceiver, the processor executing software stored in the memory causing the apparatus to perform the steps of:
 communicating a request to a server to join a first multicast group, the first multicast group associated with a first multicast address;
 determining a second multicast group corresponding to the first multicast group, the second multicast group having a second multicast address;
 joining the second multicast group to create a corresponding multicast tunnel;
 receiving a first multicast packet from the server using the multicast tunnel, the first multicast packet comprising the first and second multicast addresses;
 removing the second multicast address from the first multicast packet; and
 forwarding the first multicast packet comprising the first multicast address to an entity, wherein the apparatus comprises a mobile router or a foreign agent.

11. A method for multicast communications comprising the steps of:
at a first entity that has joined a first multicast group that is associated with a first multicast address:
detecting that the first entity is served by a second entity that performs proxy multicast communications using a first server, wherein the second entity comprises a mobile router or a foreign agent; and
disabling direct multicast communications using a second server to allow the second entity to perform proxy multicast communications on behalf of the first entity, the proxy multicast communication comprising:
 joining a second multicast group, corresponding to the first multicast group, to create a corresponding multicast tunnel, wherein the second multicast group has a second multicast address;
 receiving a first multicast packet from the second server using the multicast tunnel, the first multicast packet comprising the first and second multicast addresses;
 removing the second multicast address from the first multicast packet; and
 forwarding the first multicast packet comprising the first multicast address to the first entity.

12. The method of claim 11, wherein the first entity comprises one of a mobile node and a mobile router.

13. The method of claim 11, wherein the first and second entity are configured for performing Mobile Internet Protocol (MIP) in accordance with one of MIPv4 and MIPv6.

14. The method of claim 13, wherein the first and second entity are configured for performing one of an Internet Group Management Protocol and Multicast Listener Discovery.

15. The method of claim 11 further comprising the steps of:
at the first entity:
detecting that the first entity is no longer served by the second entity; and
enabling, based on at least one parameter, the direct multicast communications using the second server.

16. The method of claim 15, wherein the at least one parameter comprises the first entity failing to detect any entity that serves the first entity and that performs proxy multicast communications using a server.

* * * * *

UNITED STATES PATENT AND TRADEMARK OFFICE
CERTIFICATE OF CORRECTION

| | | |
|---|---|---|
| PATENT NO. | : 7,701,937 B2 | Page 1 of 1 |
| APPLICATION NO. | : 11/249637 | |
| DATED | : April 20, 2010 | |
| INVENTOR(S) | : Narayanan et al. | |

It is certified that error appears in the above-identified patent and that said Letters Patent is hereby corrected as shown below:

In Column 14, Line 38, delete "(CCOA)" and insert -- (CCoA) --, therefor.

In Column 15, Line 30, delete "inEncryptedG2." and insert -- in-EncryptedG2. --, therefor.

In Column 15, Line 35, delete "inEncryptedG2" and insert -- in-EncryptedG2 --, therefor.

Signed and Sealed this
Seventeenth Day of July, 2012

David J. Kappos
*Director of the United States Patent and Trademark Office*